(12) United States Patent
Nakamura et al.

(10) Patent No.: US 6,279,748 B1
(45) Date of Patent: Aug. 28, 2001

(54) PROCESS AND SYSTEM FOR THE RECYCLING OF HOUSEHOLD WASTE

(75) Inventors: Koichi Nakamura; Yoshihiko Watanabe; Kazufumi Watabe, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/251,440

(22) Filed: Feb. 17, 1999

(30) Foreign Application Priority Data

Feb. 18, 1998 (JP) .................................................. 10-036174

(51) Int. Cl.$^7$ ................................. B03B 1/00; C05F 11/08
(52) U.S. Cl. ........................... 209/3; 71/8; 71/9; 71/10; 71/903; 209/12.2; 209/38; 209/930
(58) Field of Search .............................. 71/9, 8, 10, 903; 209/3, 4, 7, 12.1, 12.2, 38, 127.1, 930

(56) References Cited

U.S. PATENT DOCUMENTS

| | | | |
|---|---|---|---|
| 3,579,320 | * | 5/1971 | Pesses ........................................ 71/9 |
| 3,736,120 | * | 5/1973 | Tempe ......................................... 71/9 |
| 4,758,344 | * | 7/1988 | Wildenauer ................................. 71/9 |
| 5,250,100 | * | 10/1993 | Armbristor ................................. 71/9 |
| 5,322,792 | * | 6/1994 | Peguy ......................................... 71/9 |
| 5,522,913 | | 6/1996 | Peguy . |

FOREIGN PATENT DOCUMENTS

| | | |
|---|---|---|
| 51-113369 | 10/1976 | (JP) . |
| 52-652 | 1/1977 | (JP) . |
| 55-155782 | 12/1980 | (JP) . |
| 56-89889 | 7/1981 | (JP) . |
| 57-10787 | 2/1982 | (JP) . |
| 57-27066 | 6/1982 | (JP) . |
| 4-346883 | 12/1992 | (JP) . |
| 5-200380 | 8/1993 | (JP) . |
| 9-24360 | 1/1997 | (JP) . |
| 9-208975 | 8/1997 | (JP) . |

* cited by examiner

Primary Examiner—Wayne Langel
(74) Attorney, Agent, or Firm—Foley & Lardner

(57) ABSTRACT

The household waste treatment requires neither incineration nor disposal in landfills. Two processing sub-systems, first one for combustibles and the other or second one for incombustibles, cooperate with each other as a single system for recycling the waste. The first sub-system deals with combustible waste to yield products for fertilizing and/or conditioning soil. In the process, what are inappropriate to the production of the soil fertilizing and/or conditioning products are sent to the second sub-system, which deals with incombustible waste. This sub-system sorts the incombustible waste materials into various kinds of recyclable products. Combustibles among the incombustible waste materials are sent to the first sub-system.

7 Claims, 4 Drawing Sheets

PROCESS AND SYSTEM FOR THE RECYCLING OF HOUSEHOLD WASTE

FIELD OF THE INVENTION

The present invention relates to a process for the recycling of household waste and a system therefor.

BACKGROUND OF THE INVENTION

In conventional processes, household waste that has been collected is collected and deposited in a pit. Then, the waste material is roughly crushed and fragmented in order to facilitate incineration or stocking in landfills.

Dioxins, a highly toxic group of chemicals, are produced when polyvinyl chloride (PVC) and other plastic waste are burned at temperatures below 700° C. To prevent the production of dioxins, Government regulations have been enacted. Higher costs of incineration of the waste to comply with the Government regulations have led various communes to pay more attention to the effective treatment of the waste without incineration. Stocking the waste in landfills may cause serious environmental concerns.

An object of the present invention aims at the treatment of household waste without incineration and provides a process and system for the recycling of the household waste.

SUMMARY OF THE INVENTION

According to one aspect of the present invention, there is provided a process for the recycling of household waste comprising:

converting household waste materials into products for fertilizing and/or conditioning soil.

According to another aspect of the present invention, there is provided a process for the recycling of household waste comprising the steps of:

converting an input waste that includes a portion of "combustible" waste materials of household waste into products for fertilizing and/or conditioning soil;

sorting an input waste that includes a portion of "incombustible" waste materials of household waste into various kinds of recyclable products;

sending the remainder of the "combustibles" waste materials, which is inappropriate to the transformation into the soil fertilizing and/or conditioning products, to said sorting step as said input waste thereto; and sending the remainder of the "incombustible" waste materials to said converting step as said input waste thereto.

According to still another aspect of the present invention, there is provided a process for the recycling of household waste comprising the steps of:

processing waste materials of household waste collected as "combustible;" and processing waste materials of the household waste collected as "incombustible;"

wherein said "combustible" waste materials processing step includes the sub-steps of:

converting organic portion of said "combustible" waste materials into products for fertilizing and/or conditioning soil; and subjecting the remainder of said "combustible" waste materials to said "incombustible" waste materials processing step.

According to a further aspect of the present invention, there is provided a system for the recycling of household waste comprising:

a first sub-system for waste materials of household waste collected as "combustible,"

said first sub-system including a cutter for cutting input waste materials into fragments of different sizes, a drier for drying said cut fragments and a separator for separating said dried cut fragments by size into a first group appropriate to products for fertilizing and/or conditioning soil and a second group inappropriate to said soil fertilizing and/or conditioning products; and a second sub-system for waste materials of household waste collected as "incombustible,"

said second sub-system including a bag breaker for breaking bags containing waste materials to allow the waste materials to come out of said bags and a multistage separator for separating, by material, said broken bags, said waste materials coming out of said bags and said second group of dried cut fragments, said multistage separator being operative to separate organic materials out of the waste materials being processed for the subsequent admission into said cutter of said first sub-system.

DESCRIPTION OF THE PREFERRED EMBODIMENTS

Household waste is typically a mixture of organic materials, such as food wastes, paper, and cellulose packaging materials, and inorganic materials, such as plastic packaging materials, fabrics, ferrous and non-ferrous objects, batteries, synthetic material etc. Members constituting each home or office are entrusted to separate materials that are inappropriate to incineration from the remainder in accordance with the community regulations and deposit in a pit them, as "incombustible." The remainder of the materials of the household waste is packed, as "combustible," in garbage bags. The waste materials that have been deposited in a pit as "incombustible" and the waste materials that have been packed as "combustible" are separately collected. According to the community regulations, for example, the waste materials to be collected as "combustible" include food wastes, paper and green wastes. Examples of green waste are grass clippings, twigs and branches. The waste materials to be collected as "incombustible" include ferrous objects, aluminum, glass and plastics.

The waste materials that have been collected as "combustible" include mostly combustible materials, but may include materials that are classified as "incombustible." The waste that have been collected as "incombustible" include mostly incombustible materials, but may contain materials that are classified as "combustible."

Figure 1:
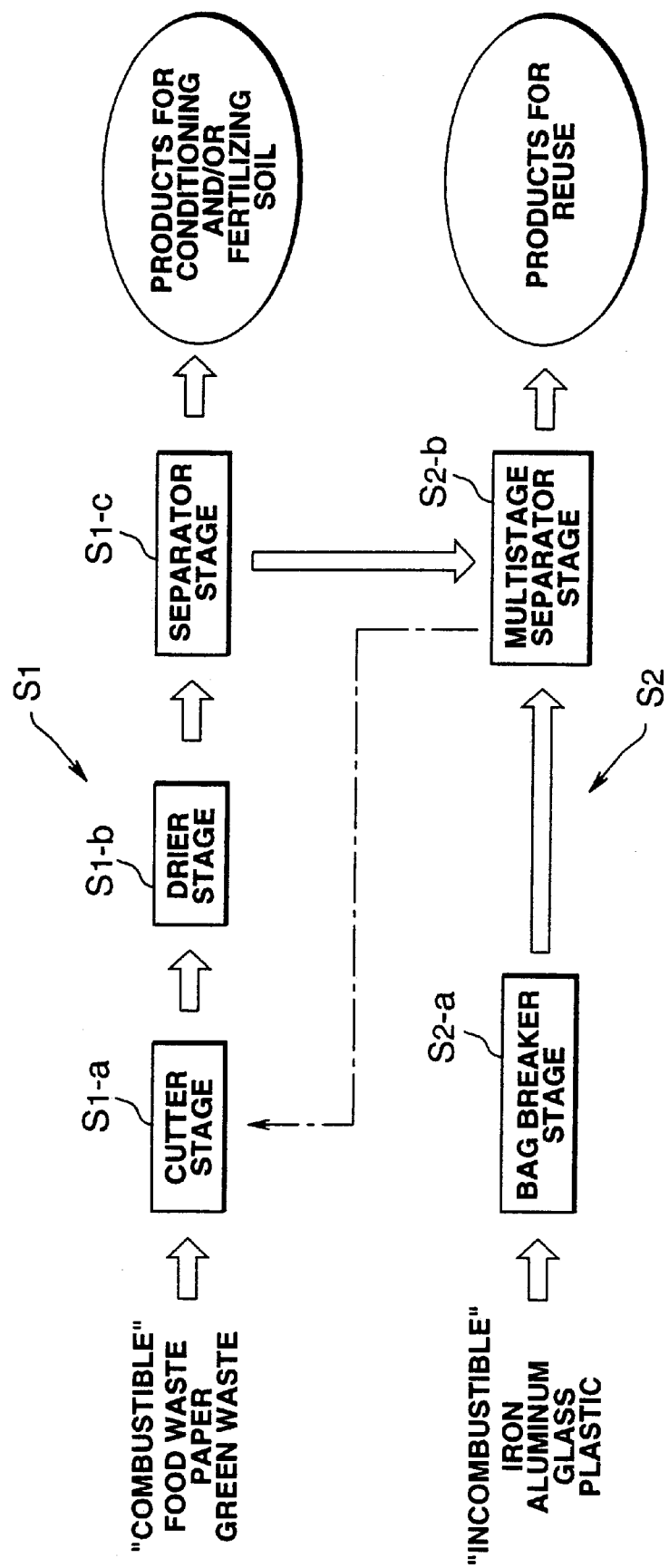
FIG. 1 illustrates schematically a process for handling household waste.

Referring to FIG. 1, the process for handling household waste is schematically shown. The process comprises a first or "combustible" processing $S_1$ for processing waste materials that come out of plastic bags that have been collected as "combustible" and a second or "incombustible" processing $S_2$ for processing waste materials that come out of plastic bags that have been collected as "incombustible."

The first processing $S_1$ has a cutter stage $S_{1-a}$ for cutting input waste materials into smaller fragments, a drier stage $S_{1-b}$ for drying the cut fragments and a separator stage $S_{1-c}$. The separator stage $S_{1-c}$ separates the dried fragments as a usable output product for soil conditioner and/or fertilizer from the remainder. The separator stage $S_{1-c}$ outputs the remainder of the fragments as an inappropriate output material to products for fertilizing and/or conditioning soil.

The separator stage $S_{1-c}$ separates the dried fragmented waste materials as the output product appropriate to products for fertilizing and/or conditioning soil after removing ferrous objects by an electromagnet and removing the cut fragments inappropriate to the soil fertilizing and/or conditioning products by a filter. The separated output product appropriate to the soil fertilizing and/or conditioning products includes fermentable organic waste materials excluding plastic. The output products that have been removed by the separator stage $S_{1-c}$ include non-fermentable inorganic waste materials.

The fermentable organic waste materials are subject to the subsequent fermentation process to grow into products for fertilizing and/or conditioning soil. The output products that have been removed during the separator stage $S_{1-c}$ are subject to the second processing $S_2$.

The second processing $S_2$ sorts the waste materials being processed into various kinds of reusable output products such as ferrous objects, aluminum, glass, plastics. Among the waste materials collected as "incombustible", plastic beverage containers, aluminum beverage containers, and food and beverage containers made of glass are packed in plastic garbage bags. Thus, the second processing $S_2$ has a bag breaker stage $S_{2-a}$ prior to the subsequent multistage separator stage $S_{2-b}$. The plastic garbage bags are broken by the bag breaker stage $S_{2-a}$ into plastic fragments. These plastic fragments are handled together with plastics being processed. The waste materials coming out of the broken garbage bags are sorted by the multistage separator stage $S_{2-b}$ into usable output products, such as iron, aluminum, glass and plastic.

The waste materials held to be in appropriate to products for fertilizing and/or conditioning soils by the first processing $S_1$ are used as the input to the multistage separator stage $S_{2-b}$. The multistage separator stage $S_{2-b}$ sorts the input waste materials from the first processing $S_1$ into the usable output products. In the multistage separator stage $S_{2-b}$, organic waste materials are separated. The organic materials from the multistage separator stage $S_{2-b}$ are sent to the first processing $S_1$ and used as the input to the cutter stage $S_{1-a}$. The organic materials from the multistage separator stage $S_{2-b}$ are subject to cutting in the cutter stage $S_{1-a}$, drying in the drier stage $S_{1-b}$ and sorting in the separator stage $S_{1-c}$.

From the preceding description, it is now understood that the preferred implementation of the present invention does not rely on incineration in handling waste materials. The waste materials collected as "combustible" are grown into products for fertilizing and/or conditioning soil, and the waste materials collected as "incombustible" are sorted into various usable output products.

Figure 2:
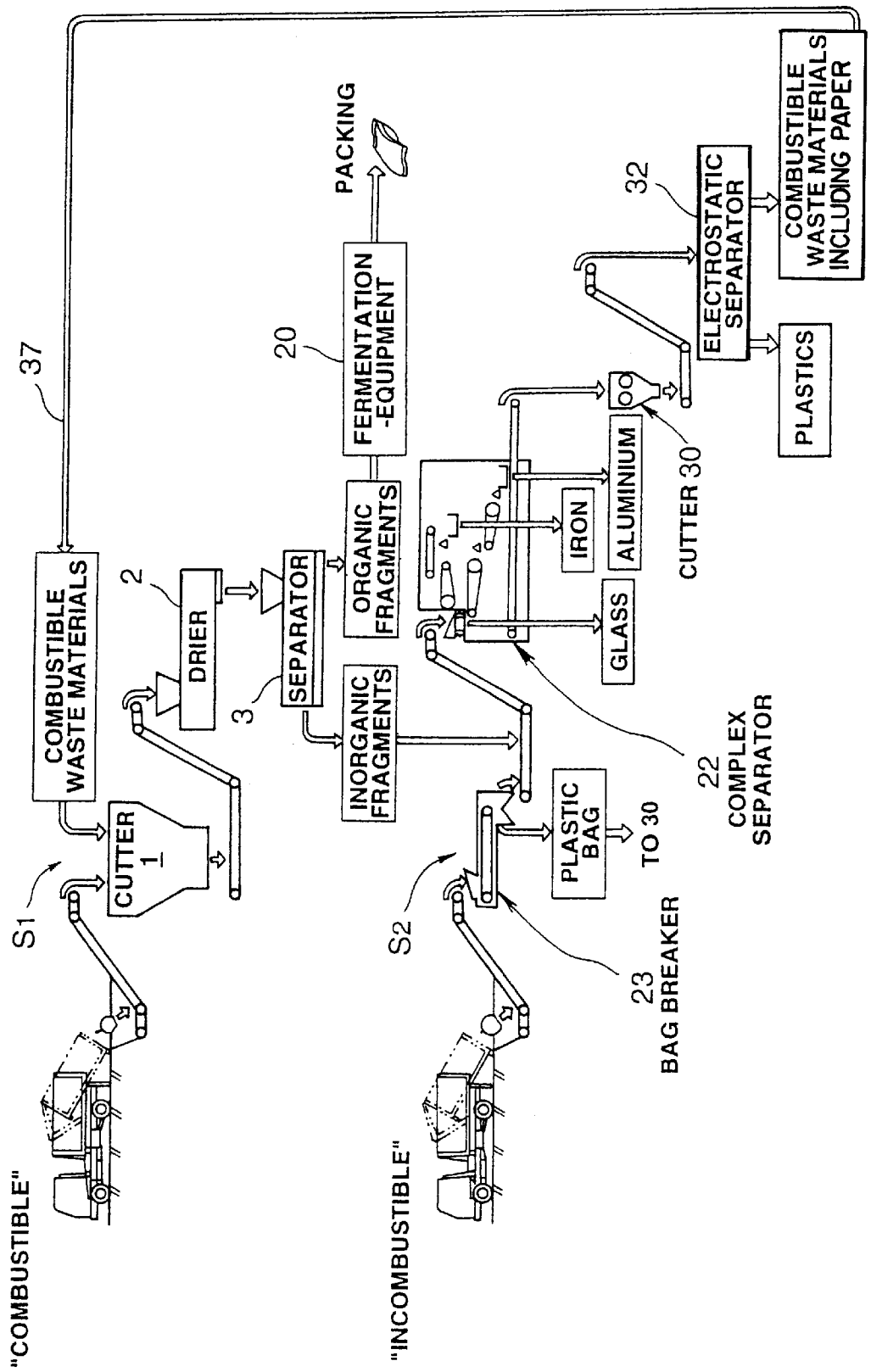
FIG. 2 illustrates a preferred implementation of a system for practicing the process.

FIG. 2 illustrates the preferred implementation of a system according to the present invention for practicing the process. The system includes a first or "combustible" processing sub-system $S_1$ and a second or "incombustible" processing subsystem $S_2$.

The first processing sub-system $S_1$ has a cutter 1, a drier or drying equipment 2 and a separator 3. The separator 3 is a machine for separating waste materials of different particle sizes.

Waste materials, which have been collected as "combustible," are used as the input to the cutter 1 of the first processing sub-system $S_1$. The cutter 1 cuts the input waste into fragments. The fragmented waste materials, which are the output of the cutter 1, are sent to the drier 2.

Figure 3:
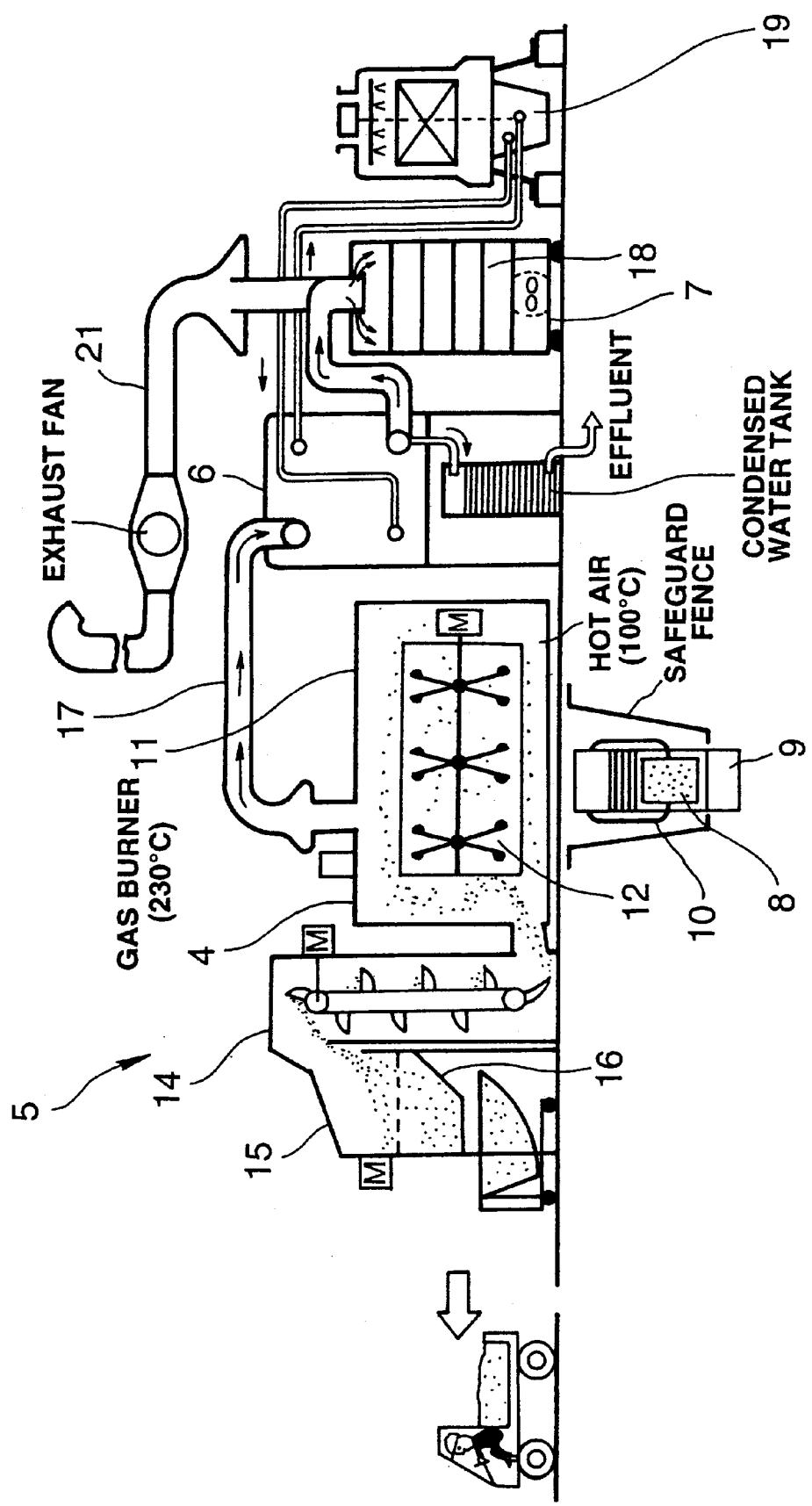
FIG. 3 illustrates a drier and a separator that may be used in the system.

FIG. 3 illustrates the preferred embodiment of the drier 2 and the separator 3. The drier 2 Includes a chamber 4, an output device 5, a dehumidifier 6 and a deodorizing equipment 7. The cut fragments of the waste materials are transferred to the drier 2 by a conveyer (see FIG. 2) or by a container 8 on an industrial hand cart 9. The waste materials are admitted into the chamber 4 by an automatic supply device 10. The automatic supply device 10 throws in the waste materials into the chamber 4.

The temperature within the chamber 4 is held higher than 100° C. by burning of gas ejected from a gas burner 11. An agitator 12 within the chamber 4 mixes the waste materials within the chamber to facilitate hot air drying. A bucket conveyer 14 conveys the dried output of the chamber 4 to a sieve 15 that constitutes the separator 3 of the system shown in FIG. 2. The output materials of the sieve 15 are temporarily loaded into and discharged from a hopper 16.

Exhaust gas resulting from the hot air drying within the chamber 4 contains moisture. This moisture containing exhaust gas is introduced into the dehumidifier 6 by a moisture discharge duct 17. Temperature of the exhaust gas introduced into the dehumidifier 6 Is removed by a water flow from a cooling tower 19 to turn the moisture into water that is discharged as effluent. The moisture free exhaust gas from the dehumidifier 6 is introduced into the deodorizing equipment 7. Odor is removed from the exhaust gas by a deodorizer 18.

The exhaust gas from the deodorizing equipment 7 is discharged into the outside by an exhaust duct 21.

The materials discharged from the hopper 16 are carried into a fermentation-equipment 20 (see FIG. 2), which undergoes fermentation of the input material. The output products of the fermentation-equipment 20 are used for fertilizing and/or conditioning soil.

The residual materials that have failed to pass through the sieve 15 are transferred to the second sub-system $S_2$.

The second sub-system $S_2$ includes a bag breaker 23 and a multistage separator 22. According to this preferred implementation, the second sub-system $S_2$ further includes a cutter 30 and an electrostatic separator 32 for refined separation of fragments of different materials.

Figure 4:
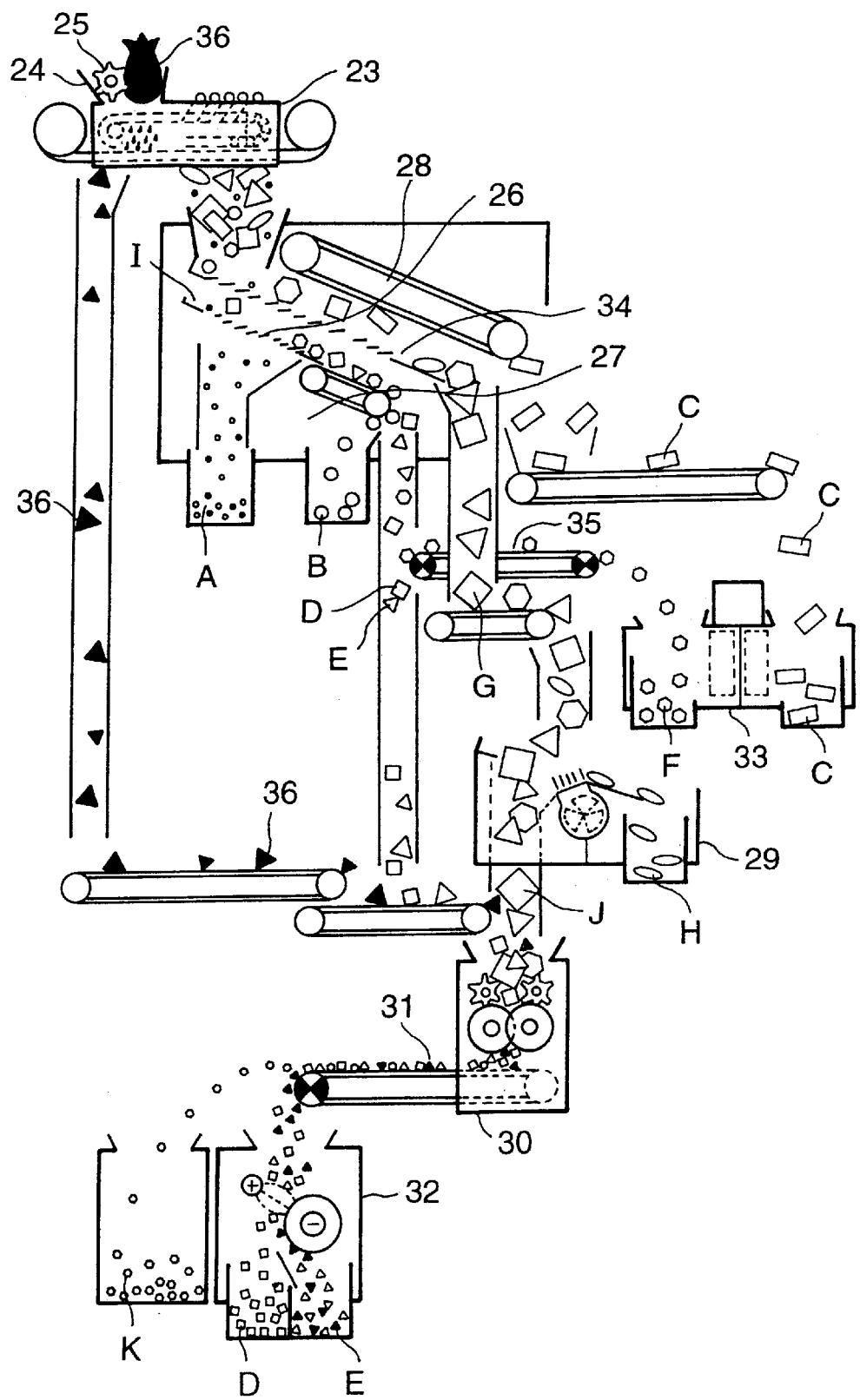
FIG. 4 illustrates schematically a process flow that may be used in the system.

FIG. 4 illustrates schematically a process flow of the second sub-system $S_2$. According to this illustrated flow, the input waste materials collected as "incombustible" in plastic garbage bags 36 are included in the input materials of the second sub-system $S_2$. The plastic bags 36 are thrown into a hopper 24 of the bag breaker 23. If desired, the waste materials may be fed as the input to the multistage separator 22 (see FIG. 2) after being taken out of the plastic bags 36.

Referring to FIG. 4, a cutter 25 within the hopper 24 breaks up each of the plastic garbage bags 36 into fragments. The bag fragments 36 are separated from the waste materials and conveyed to the cutter 30. The waste materials coming out of the bags 36 drop on a sieve 34. The sieve 34 separates the input waste materials of different sizes. Small size waste materials I that have passed through the sieve 34 drop on a vibratory feeder26. The vibratory feeder26 is a vibrating conveyer with a relatively low frequency and large amplitude of motion and sends the small size waste materials I in an inclined downward direction. During this motion, soil and cullet A are removed and a separator 27 for separating and removing cylindrical cells B from the waste materials that have been dropped on the vibratory feeder 26. This separator 27 removes the cells B by comparing the shape of each cell with a shape pattern. The small size waste materials I without soil and cullet A and cells B are sent to the cutter 30.

The waste materials with large sizes that will not pass through the sieve 34 slides down a slope of the sieve 34. Ferrous objects C are removed with a suspended separator 28 over the slope of the sieve 34.

The remainder G of the large size waste materials drop down to a weight separator 29 past an aluminum separator 35, The aluminum separator 35 removes aluminum objects F. The ferrous objects C and aluminum objects F are reduced in volume by a volume reducing equipment 33. The weight separator 29 separates, by weight, the input large size waste materials G into beverage and food containers made of glass H and the remainder J. The remainder J of waste materials of large sizes is introduced into the cutter 30. The cutter 30 cuts the input broken garbage bags 36, small size waster materials I and the large size waste materials J into fragments and discharge the cut fragments onto a high performance aluminum separator 31. This separator 31 removes aluminum objects K. An electrostatic separator 32 separates the cut fragments without aluminum objects K into paper D and plastic fragments E.

Referring also to FIG. 2, the multistage separator 22 of the second sub-system $S_2$ is connected to the cutter 1 of the first sub-system $S_1$ by a conveyer line 37. More particularly, combustible waste materials like paper D that are separated by the electrostatic separator 32 of the multistage separator 22 are collected in a combustible waste collecting portion, and this combustible waste collecting portion is sent to the cutter 1 by the conveyer line 37.

In other words, the cutter 1 of the first sub-system $S_1$ receives, as an additional input, combustible waste materials that have been sent from the second sub-system $S_2$ by the conveyer line 37. Subsequently, the cut fragments discharged by the cutter 1 are dried and separated and then introduced into fermentation-equipment 20. Incombustible inorganic waste fragments that have been separated are introduced back into the multistage separator 22 of the second-sub-system $S_2$.

Referring back to FIG. 4, if the plastic fragments E that have been removed by the electrostatic separator 32 contain rubber, leather or fabric, the rubber, leather and fabric are removed and sent to a waste processing center over a number of communities.

In the preferred implementation, the multistage separator 22 handles household waste materials collected as "incombustible" and the drier 2 handles household waste materials collected as "combustible." The first or "combustibles" processing sub-system $S_1$ and the second or "incombustible" processing sub-system $S_2$ cooperate with each other to work as a single system. The incombustible inorganic waste materials from the drier 2 are fed to the multistage separator 22, while the combustible waste materials from the multistage separator 22 are fed to the drier 2. The combustible components of the household waste are converted into products for fertilizing and/or conditioning soil, and the incombustible components are separated for reusable products. This facilitates recycling of the household wastes.

In the previous description, the hearing within the chamber 4 relied only on the gas burner 11. The garbage within the chamber 4 can be dried within a shortened period of time (3 to 6 hours) with multi-heating using far infrared radiation, heat conduction (120° C.) and agitation with hot air (about 280° C.), Using this multi-heating, germs within the garbage are killed, and thus the dried output products may be used as prompt. The use of this prompt will not cause any environmental pollution. Using soft ceramics as the deodorant 18 within the deodorizing equipment 7 is effective in eliminating offensive odors of the gas discharged during the drying process.

From the preceding description, it will now be appreciated that household waste can be handled without replying on incineration and depositing in landfill. It will also be appreciated that the preferred implementations according to the present invention comply with recommended waste management without any incineration, any deposition in landfill, any dumping, any offensive odors and any unnecessary transportation.

The above-described preferred implementations of the present invention are example implementations. Moreover various modifications to the present invention may occur to those skilled in the art and will fall within the scope of the present invention as set forth below.

What is claimed is:

1. A system for the recycling of household waste comprising:
   a first system for handling household waste mainly containing combustible material; and
   a second system for handling household waste mainly containing incombustible material,
   wherein the first system comprises:
      a first cutter that cuts the household waste mainly containing combustible material and organic materials separated from the second system into fragments,
      a drier that dries the fragments,
      a separator that separates the dried fragments into a first group suitable for forming a fertilizing or soil conditioning product and a second group unsuitable for forming a fertilizing or soil conditioning product, and
      a first conveyor that feeds the second group to the second system, and
   wherein the second system comprises:
      a bag breaker that breaks bags holding the household waste mainly containing incombustible material;
      a bag separator that separates the broken bags from the household waste mainly containing incombustible material;
      a multistage separator that receives and separates recyclable products and organic materials from the household waste mainly containing incombustible material and the second group received from the first system;
      a second conveyor that feeds the organic materials separated from the multistage separator to the cutter of the first system.

2. A system according to claim 1, wherein the first group is organic fragments and the second group is inorganic fragments.

3. A system according to claim 2, wherein the recyclable products include aluminum, glass, iron, and plastic.

4. A system according to claim 2, wherein the multistage separator includes:
   a sieve that separates first largest sized objects from the household waste mainly containing incombustible material and the second group;
   a vibratory feeder that separates next largest sized objects from the remaining household waste and the second group;

a first separator that separates cylindrical objects from the next largest sized objects from the vibratory feeder;

a second separator that separates ferrous objects from the first largest sized objects from the sieve;

a third separator that separates glass from the first largest sized objects from the second separator;

a fourth separator that separates aluminum from the next largest sized objects from the first separator.

5. A system according to claim 4, wherein the multistage separator further includes a second cutter that cuts the largest sized objects that have been sorted for ferrous and glass objects, the next largest sized objects that have been sorted for aluminum, and the broken bags from the bag breaker into smaller fragments.

6. A system according to claim 5, wherein the multistage separator further includes:

a fifth separator that separates aluminum from the smaller fragments cut by the second cutter; and a sixth separator that separates paper and plastic from the smaller fragment cut by the second cutter.

7. A system according to claim 6, wherein the sixth separator is an electrostatic separator.

* * * * *